United States Patent [19]

Morita

[11] Patent Number: 4,643,480
[45] Date of Patent: Feb. 17, 1987

[54] STRUCTURE FOR SECURING THE TRIM COVER ASSEMBLY OF A SEAT BACK

[75] Inventor: Isao Morita, Akishima, Japan

[73] Assignee: Tachikawa Spring Co., Tokyo, Japan

[21] Appl. No.: 761,524

[22] Filed: Aug. 1, 1985

[30] Foreign Application Priority Data

Aug. 27, 1984 [JP] Japan .......................... 59-129626[U]

[51] Int. Cl.4 ............................................. A47C 31/00
[52] U.S. Cl. .................................... 297/218; 297/219; 297/226; 297/452
[58] Field of Search ............... 297/218, 219, 226, 452, 297/455, DIG. 1; 29/91, 91.5-91.8

[56] References Cited

U.S. PATENT DOCUMENTS

| 1,695,581 | 12/1928 | Faris | 297/452 |
| 2,673,600 | 3/1954 | Cramer | 297/452 |
| 3,167,352 | 1/1965 | Johnson | 297/452 X |
| 3,747,178 | 7/1973 | Harder, Jr. | 297/218 X |

FOREIGN PATENT DOCUMENTS

| 94637 | 10/1962 | Denmark | 297/452 |
| 2523343 | 12/1975 | Fed. Rep. of Germany | 297/455 |

Primary Examiner—James T. McCall
Assistant Examiner—Peter R. Brown
Attorney, Agent, or Firm—Cushman, Darby & Cushman

[57] ABSTRACT

A structure for securing the trim cover assembly of a seat back in an automotive seat is disclosed in which the seat back is formed in the back thereof with a slit extending along the internal periphery of the seat back. The end portions of a front-side trim cover assembly for covering the front side of the seat back are inserted through the slit and are fixed to the interior of the seat back. The securing portions of hard material disposed in the peripheral end portions of a back-side trim cover assembly for covering the back side of the seat back are inserted through the slit and thereafter, due to the tension of the back-side trim cover assembly, are engaged with the inner side of the slit.

1 Claim, 9 Drawing Figures

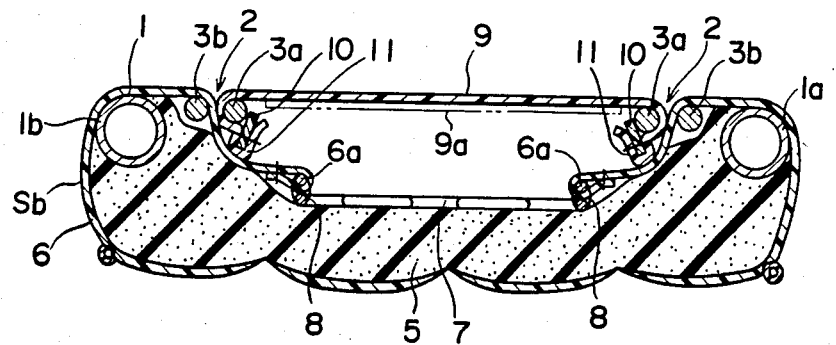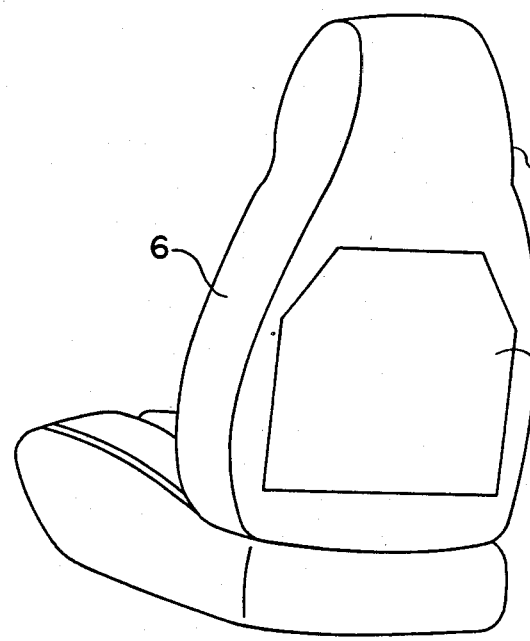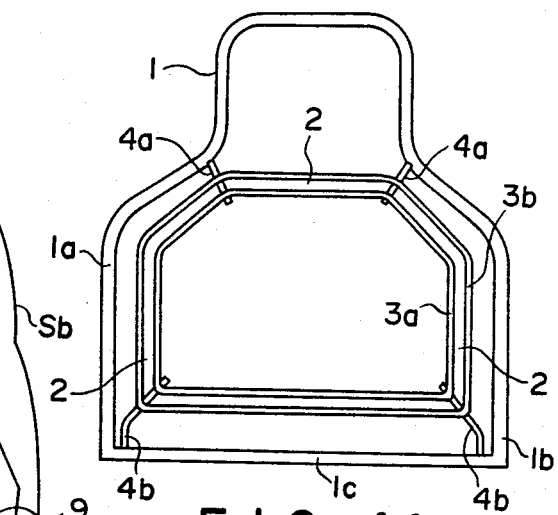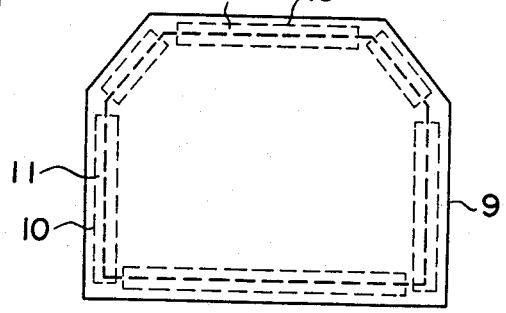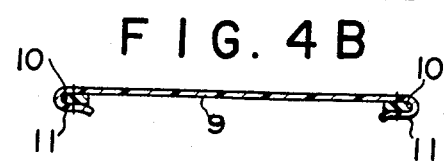

STRUCTURE FOR SECURING THE TRIM COVER ASSEMBLY OF A SEAT BACK

BACKGROUND OF THE INVENTION

1. Field of the Invention

The present invention relates to a structure for securing the trim cover assembly of a seat back in an automotive seat and, in particular, to such structure of a type that fixedly secures, on the back side of the seat back, two separate trim cover assemblies which are respectively used to cover the front side of the seat back and the back side of the same seat back.

2. Description of the Prior Art

Generally, to complete a seat such as a vehicle seat, a seat frame of a desired form is enclosed by a seat pad, and then the outside surface of the seat pad is covered by a trim cover assembly.

Conventionally, there have been proposed various kinds of structures for securing or covering the outer surface of a seat back of such seat with the trim cover assembly. For example, the entire peripheral surfaces are covered with the trim cover assembly in a bag manner, or, after the front surface of the seat pad is covered with the trim cover assembly, a back board comprising a hardboard or resin plate with leather or cloth adhesively applied thereto for appearance sake is attached to the back side of the seat back by means of fasteners such as tapping screws, staples or the like.

However, in the securing structure of the above-mentioned conventional seat back trim assembly, an operation of covering the seat pad with the trim cover assembly is very complicated; and, in the latter, since the head portion of the fastener is exposed, a hard image is produced. To solve this problem, for example, a seat as disclosed in Japanese Utility Model Publication No. 38131 of 1984 was proposed. In this seat, after the front surface of a seat back is covered with a trim cover assembly, a back board is engaged to two engagement pieces fixed to the two sides of a back frame by means of hook-shaped portions formed in the two side portions of the back board.

However, with this last-mentioned conventional seat, the back board is partially secured only in its two side portions to the seat back, resulting in uncertain securing strength. Also, the boundary portions between the trim cover assembly and the back board can not be brought into perfect contact to leave a clearance, which may impair the appearance of the seat. Further, the back board must be limited to a hard plate, and it is difficult to use a soft material instead of the hard plate. Accordingly, the seat provided with such back board has several drawbacks to be solved. For example, in a high-class motorcar, the seat is not suitable because it does not match the interior trim of the car.

SUMMARY OF THE INVENTION

The present invention aims at eliminating the drawbacks found in the above-mentioned prior art structures.

Accordingly, it is a primary object of the invention to provide a simple structure which is capable of securing a trim cover assembly positively and also of providing a seat having an excellent appearance.

In order to accomplish the above object, according to the invention, two wires are fixed along the inside peripheries to form a slit therebetween. First, the end of a front side trim cover assembly to be secured on the front side of a seat back is inserted through the slit from outside and is then fixed to the interior of the back of the seat back. At the same time, a hard member of resin material or the like is sewn to the peripheral end of a back-side trim cover assembly to form a securing portion, and then the securing portion, as with the end of the front-side trim cover assembly, is inserted through the slit so that the back-side trim cover assembly can be attached to the seat back.

Thus, the securing portion of the back-side trim cover assembly becomes engaged inside of the slit after it is inserted therethrough. As a result of this securement, the back-side trim cover assembly can be positively fixed to the back of the seat back and the boundary portions of the front- and back-side trim cover assemblies can be brought into close contact with each other.

Other and further objects, features and advantages of the invention will appear more fully from the following description with reference to the accompanying drawings.

BRIEF DESCRIPTION OF THE DRAWINGS

FIG. 1 is a horizontal sectional view of a seat back, illustrating a first embodiment of the invention;

FIG. 2 is a rearward perspective view of a seat incorporating the invention;

FIG. 3 is a back view of a back frame employed in the seat back of FIG. 1;

FIGS. 4A and 4B illustrate views of a back-side trim cover assembly employed in the above seat back; A is a back view thereof and B is a horizontal sectional view thereof;

DETAILED DESCRIPTION OF PREFERRED EMBODIMENTS OF THE INVENTION

Figure 5:
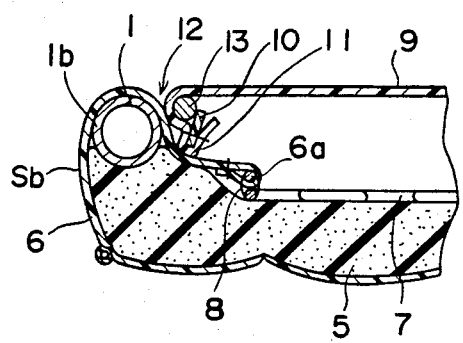
FIG. 5 is a horizontal sectional view of a seat back half section of which part is omitted, illustrating a second embodiment of the invention.

FIGS. 1–4 illustrate a first embodiment of the invention. As shown in FIG. 1, a back frame (1) is formed of a pipe material into a desired framelike shape. There is formed a slit (2) extending along the entire periphery of the portion of the inside periphery of the back frame (1) to which a back side trim cover assembly is attached.

In particular, as shown in FIG. 3, along the inside periphery of the back frame (1), there are extended two wires (3a)(3b) in a frame-like manner at desired intervals, the respective upper and lower portions of which are fixed to the two side sections (1a)(1b) and the bottom section (1c) of the back frame (1) via fixing wires (4a) and (4b). The above-mentioned two wires (3a)(3b) define the slit (2) therebetween.

First, returning to FIG. 1, a pad (5) is so disposed as to enclose the front surface of the back frame (1) and the outer surface of the pad (5) is covered with a front-side trim cover assembly (6). After then, the end portion of the front trim cover assembly (6) is inserted through the slit (2) from outside and a trim wire (6a) attached to the terminal of the end portion is connected to an S (zigzag) spring (7) supporting the back side of the pad (5) by means of a hog ring (8).

As shown in FIG. 2, after the front trim cover assembly (6) is placed over the surface of the seat back Sb, a back-side trim cover assembly (9) is attached to the back of the seat back Sb.

The back-side trim cover assembly (9), as shown in FIG. 4, is formed of an elastic material such as a synthetic resin leather, a knitting, a textile or the like such that it has a configuration, as shown in FIG. 3, corresponding to the slit (2) formed in the back frame (1), with its peripheral ends being turned inwardly. As shown in FIG. 4A, a plate-shaped hard member (10) of, e.g., a synthetic resin plate is fitted into the portion of the turned peripheral end corresponding to the slit (2) in the back frame (1) of FIG. 3 and is then joined by machine-sewing or the like to form a securing portion (10). The hard member (11) may be attached by using an adhesive or by welding.

Then, while the end portion of the back-side trim cover assembly (9) is being strongly pulled by hand, the associated securing portion (11) is inserted through the slit (2) from outside as with the front-side trim cover assembly (6) of FIGS. 1 and 2. After that, if you let go your hold of it, then the back-side trim cover assembly (9) is contracted due to its own elasticity, causing the securing portion (11) to be engaged within the interior of the slit (2) of FIG. 3, namely, within the interiors of the wires (3a) and (3b). As a result of this engagement, as shown in FIG. 2, the back-side trim cover assembly (9) can be fixed to the back of the seat back Sb in a tensioned way.

Since the back-side trim cover assembly (9) secured to the seat back Sb in this way is engaged along the entire periphery thereof with the slit (1) in the back frame (2), it is fixed more positively than the prior art. Also, since the boundary portions of the front- and back-side trim cover assemblies (6) and (9) are both inserted through the slit (2) to be brought into perfect contact with each other, they provide such an excellent appearance as if these front- and back-side trim cover assemblies (6), (9) were sewn together elaborately, so that the seat incorporating the thus-formed structure can wholly enjoy a high-grade feeling.

In securing the above-mentioned front-side trim cover assembly (6), it is preferred that, after the end portions thereof are inserted through the slit (2), they are secured to an S (zigzag) spring (7) in a tensioned manner as closely as possible to the central portion of the seat back Sb. This way of securing enables the end portions of the front-side trim cover assembly (6) to act in such a manner that they press against the securing portions (11) to the central portion of the seat back Sb, so that the securing portions (11) can be engaged with the slit (2) more positively to prevent the back-side trim cover assembly (9) from coming off. Such pressure of the end portions of the front-side trim cover assembly (6) against the securing portions of the back-side trim cover assembly (9) may be realized by using the elasticity of the pad (5).

Also, in this embodiment, the front- and back-side trim cover assemblies (6), (9) are formed of the same material so as to provide a seat having a generally uniform appearance similar to the appearance of the conventional seat in which its trim cover assembly is secured in a bag-like manner. As shown by a two-dot chained line in FIG. 1, a plate member (9a) or the like for reinforcement is attached to the back side of the back-side trim cover assembly (9) to make hard the entire back-side trim cover assembly (9), so that it is possible to realize the same strength as that of the conventional back board.

In addition, although in the above-described first embodiment of the invention, the two wires (3a)(3b) are provided along the internal periphery of the back frame (1) and the slit (2) is formed therebetween, according to a second embodiment of the invention, as shown in FIG. 5, a single wire (13) may be disposed at desired intervals along the internal periphery of the back frame (1) to form a slit (12) between the wire (13) and the back frame (1).

Figure 7A:
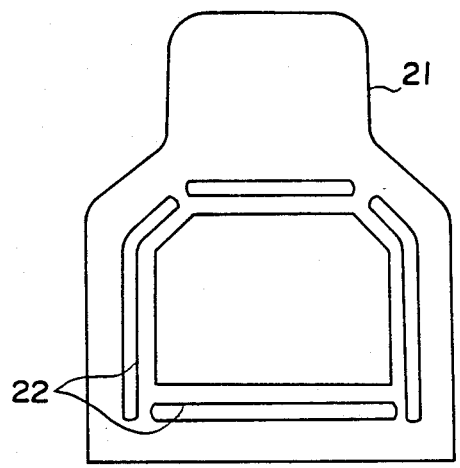
FIGS. 7A and 7B illustrate a back frame employed in FIG. 6; A is a back view thereof and B is a horizontal sectional view.
Figure 6:
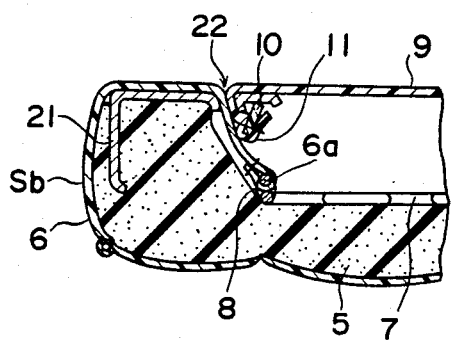
FIG. 6 is a horizontal sectional view of a seat back half section of which part is omitted, illustrating a third embodiment of the invention.
Figure 7B:
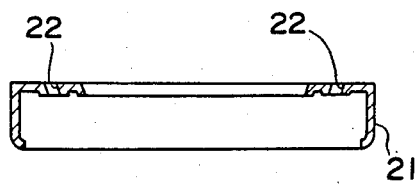

Referring further now to FIGS. 6 and 7, there is illustrated a third embodiment of the invention, in which a pan-shaped back frame (21) is employed and a slit (22) is formed directly in the bottom surface thereof, while the front- and back-side trim cover assemblies (6), (9) are inserted through the slit (22) as in the above-mentioned first embodiment. In this third embodiment, the back-side trim cover assembly (9) is directly fixed to the back frame (21) to provide an improved securing strength thereof.

Moreover, in the above-mentioned embodiments of the invention, the end portions of the front-side trim cover assembly (6) are secured via the trim wire (6a) to the S spring (7) supporting the pad (5). However, this is not limitative, but, for example, the two side portions (1a) (1b) of the back frame (1) may be provided with engagement pieces and the end portions of the front-side trim cover assembly (6) may be directly secured to these engagement pieces.

As described hereinbefore, according to the invention, several practical effects can be obtained: for example, since the back-side trim cover assembly (9) is fixed over its entire periphery to the slit (2) (12) (22) formed in the back Sb frame (1) (21), it can be secured to the seat back more positively over the prior art; and, since the front- and back-side trim cover assemblies (6) (9) are respectively inserted through the slit (2) (12) (22) with their boundary portions being brought into perfect contact with each other, there can be obtained such an impression as if they were sewn together elaborately, and, therefore, a seat having a general high-class feeling can be provided.

What is claimed is:

1. A structure for securing a trim cover assembly of a seat back having a front side, an interior, a central portion, and a rear side in an automotive seat, comprising:
   a back frame having a slit so formed that it is disposed at the rear side of said seat back and further extends along an internal periphery of the back frame;
   a front-side trim cover assembly which covers the front side of said seat back, extending to the rear side of said seat back and being inserted through said slit in the back frame so that edges of said front-side trim cover assembly are fixed to the interior of said seat back in a tensioned manner at a position adjacent to the central portion of said seat back; and
   a back-side trim cover assembly which covers the rear side of said seat back, said back-side trim cover assembly having securing portions provided at a peripheral end portion thereof, wherein said securing portions are made of a plate-shaped hard material and are inserted through said slit in the back frame in a tensioned manner so as to be engaged with the internal periphery of said back frame, thereby permitting the edges of said front-side trim cover assembly to press against said securing portions of said back-side trim cover assembly so that said securing portions are further brought into engagement with said internal periphery of said back frame;

whereby both said front-side and said back-side trim cover assembly are brought into a firm contact with each other with a clear boundary therebetween at said slit in the back frame.

* * * * *